United States Patent [19]

Rinderer

[11] Patent Number: 5,005,792
[45] Date of Patent: Apr. 9, 1991

[54] BRACKET FOR MOUNTING AN ELECTRICAL SWITCHBOX ON A WALL STUD

[75] Inventor: Eric R. Rinderer, Highland, Ill.

[73] Assignee: B-Line Systems, Inc., Highland, Ill.

[21] Appl. No.: 334,897

[22] Filed: Apr. 7, 1989

[51] Int. Cl.[5] .............................................. A47B 96/00
[52] U.S. Cl. .................................. 248/205.1; 220/3.5; 248/906
[58] Field of Search ................... 248/27.1, 27.3, 205.1, 248/300, DIG. 6; 220/3.3, 3.5, 3.6, 3.9; 174/158; 52/27

[56] References Cited

U.S. PATENT DOCUMENTS

| | | | |
|---|---|---|---|
| 1,705,768 | 3/1929 | Johnson et al. | |
| 1,774,934 | 9/1930 | Mangin | |
| 1,816,584 | 7/1931 | Hussar | |
| 1,961,728 | 6/1934 | Arnest et al. | 247/19 |
| 2,126,114 | 8/1938 | Jett | 247/21 |
| 2,214,968 | 9/1940 | MacMillen | 220/3.9 |
| 2,252,953 | 8/1941 | Walters | 220/3.9 |
| 2,299,674 | 10/1942 | Austin, Jr. | 248/311 |
| 2,439,091 | 4/1948 | Keating | 248/27.1 |
| 2,480,805 | 8/1949 | Buckels | 248/221 |
| 2,644,600 | 7/1953 | Senif | 229/5.9 |
| 3,115,265 | 12/1963 | Mulkey et al. | 220/3.5 |
| 3,360,151 | 12/1967 | Yznaga | 248/300 X |
| 3,376,005 | 4/1968 | Swanquist | 248/223 |
| 3,448,952 | 6/1969 | Swanquist et al. | 248/27 |
| 3,474,994 | 10/1969 | Swanquist | 248/205.1 |
| 3,588,017 | 6/1971 | O'Brien | 248/DIG. 6 X |
| 3,596,860 | 8/1971 | MacKay | 248/216 |
| 3,606,223 | 9/1971 | Havener | 248/205 |
| 3,622,029 | 11/1971 | Ware | 220/3.7 |
| 3,767,151 | 10/1973 | Seal et al. | 248/DIG. 6 X |
| 3,928,716 | 12/1975 | Marrero | 174/57 |
| 4,108,414 | 8/1978 | Grant, Sr. | 248/300 |
| 4,399,922 | 8/1983 | Horsley | 220/3.6 |
| 4,408,695 | 10/1983 | Balkwill et al. | 220/3.3 |
| 4,533,060 | 8/1985 | Medlin | 220/3.9 |
| 4,561,615 | 12/1985 | Medlin, Jr. | 248/27.1 |
| 4,645,089 | 2/1987 | Horsley | 220/3.6 |
| 4,787,587 | 11/1988 | Demmine | 248/205.1 |
| 4,943,022 | 7/1990 | Rinderer | 248/205.1 |

Primary Examiner—Ramon O. Ramirez
Attorney, Agent, or Firm—Senniger, Powers, Leavitt & Roedel

[57] ABSTRACT

A bracket for mounting an electrical switchbox or the like on a metal stud of generally channel shape having a web at one side constituting a closed side. The stud has a front and rear flange which define an open side of the stud between them. The bracket includes a bracket plate having a front end and a rear end and a flap generally adjacent the front edge of the bracket plate for attaching the bracket to the front flange of the wall stud in a position in which the bracket plate extends rearwardly adjacent one side of the wall stud. Track members generally adjacent the front end of the bracket plate hold an electrical switchbox or the like in fixed position relative to the bracket plate with one side of the box generally adjacent the bracket plate and with an open front of the switchbox facing forwardly. An arm on the bracket plate may be moved from a first position in which the arm extends in front-to-rear direction with respect to the bracket plate to a second position in which the arm extends laterally inwardly from the bracket plate. When the bracket is to be used at the open side of a wall stud, the arm is moved to the second position and engages the web of the wall stud to support the bracket against lateral movement.

20 Claims, 3 Drawing Sheets

BRACKET FOR MOUNTING AN ELECTRICAL SWITCHBOX ON A WALL STUD

BACKGROUND OF THE INVENTION

This invention relates generally to means for mounting electrical switchboxes and the like and, more particularly, to an improved bracket for mounting a switchbox on a metal wall stud of channel configuration.

It is often necessary in commercial constructions to mount electrical switchboxes on metal wall studs of channel configuration, one side of the stud thus being closed and the other side open. Various types of brackets have been used for this purpose, but they have drawbacks. For example, some are time-consuming to install, requiring numerous screws to attach the switchbox to the bracket. Some prior brackets also require the stud to be backed up against drywall or the like, which is not the case in many instances, as where the stud is positioned adjacent an outside wall. In the latter instances such brackets do not hold the electrical box secure against being pushed back into the wall during use. Other disadvantages of prior brackets are that different size brackets are needed to accommodate studs of different depths, and that the brackets block the use of knockouts in the side walls of the switchbox, thereby making wiring of the box more difficult.

There is a need, therefore, for an improved device for mounting electrical switchboxes and the like on metal wall studs, particularly those of channel configuration.

SUMMARY OF THE INVENTION

Among the several objects of this invention may be noted the provision of an improved bracket for mounting an electrical switchbox (or the like) on a metal wall stud of channel configuration; the provision of such a bracket which may be used to mount electrical switchboxes of different depths on metal studs of different depths; the provision of such a bracket which is adapted for mounting electrical switchboxes on either the open or closed side of a channel-shaped wall stud; the provision of such a bracket which effectively and securely mounts an electrical switchbox regardless of whether the stud backs up against a wall (e.g., drywall); and the provision of such a bracket which is formed from sheet metal in a stamping operation for economical manufacture.

Generally, a bracket of the present invention for mounting an electrical switchbox or the like on a metal stud of generally channel shape having a web at one side of the stud, constituting the closed side of the stud, generally parallel opposing flanges extending laterally outwardly from the web, one flange constituting a front flange at the front of the stud and the other flange constituting a rear flange at the rear of the stud, the flanges defining an open side of the stud between them. The bracket comprises support means having a front end and a rear end and means generally adjacent the front end of the support means for attaching the bracket to the front flange of the wall stud in a position in which the support means extends rearwardly adjacent one side of the wall stud. Means is provided generally adjacent the front end of the support means for holding an electrical switchbox or the like in fixed position relative to the support means with one side of the box generally adjacent the support means and with an open front of the switchbox facing forwardly. An arm on the support means is adapted for movement from a first position in which the arm extends in front-to-rear direction with respect to the support means to a second position in which the arm extends laterally inwardly from the support means so that, when the bracket is to be used at the open side of a wall stud and the depth of the wall stud in front-to-rear direction is greater than the length of the support means in front-to-rear direction, the arm is adapted to be moved to said second position for engagement with the web of the wall stud to support the support means against lateral movement toward the web of the stud.

In a second aspect of this invention a bracket of the present invention comprises support means having a front end and a rear end and means generally adjacent the front end of the support means for attaching the bracket to the front flange of the stated wall stud in a position in which the support means extends rearwardly adjacent one side of the wall stud. Means generally adjacent the front end of the support means holds an electrical switchbox or the like in fixed position relative to said support means with one side of the box generally adjacent said support means and with an open front of the switch box facing forwardly. The holding means comprises a pair of generally parallel, spaced-apart track members generally adjacent the front end of the support means and extending laterally outwardly with respect to the support means. The track means are adapted to slidably receive a pair of mounting ears on the switchbox projecting from opposite walls of the box. The switchbox may be slidably moved to a final position relative the support means and wall stud and means is provided to retain the switchbox in the final position.

Other objects and features will be in part apparent and in part pointed out hereinafter

BRIEF DESCRIPTION OF THE DRAWINGS

Corresponding reference characters indicate corresponding parts throughout the several views of the drawings.

DETAILED DESCRIPTION OF A PREFERRED EMBODIMENT

Figure 1:
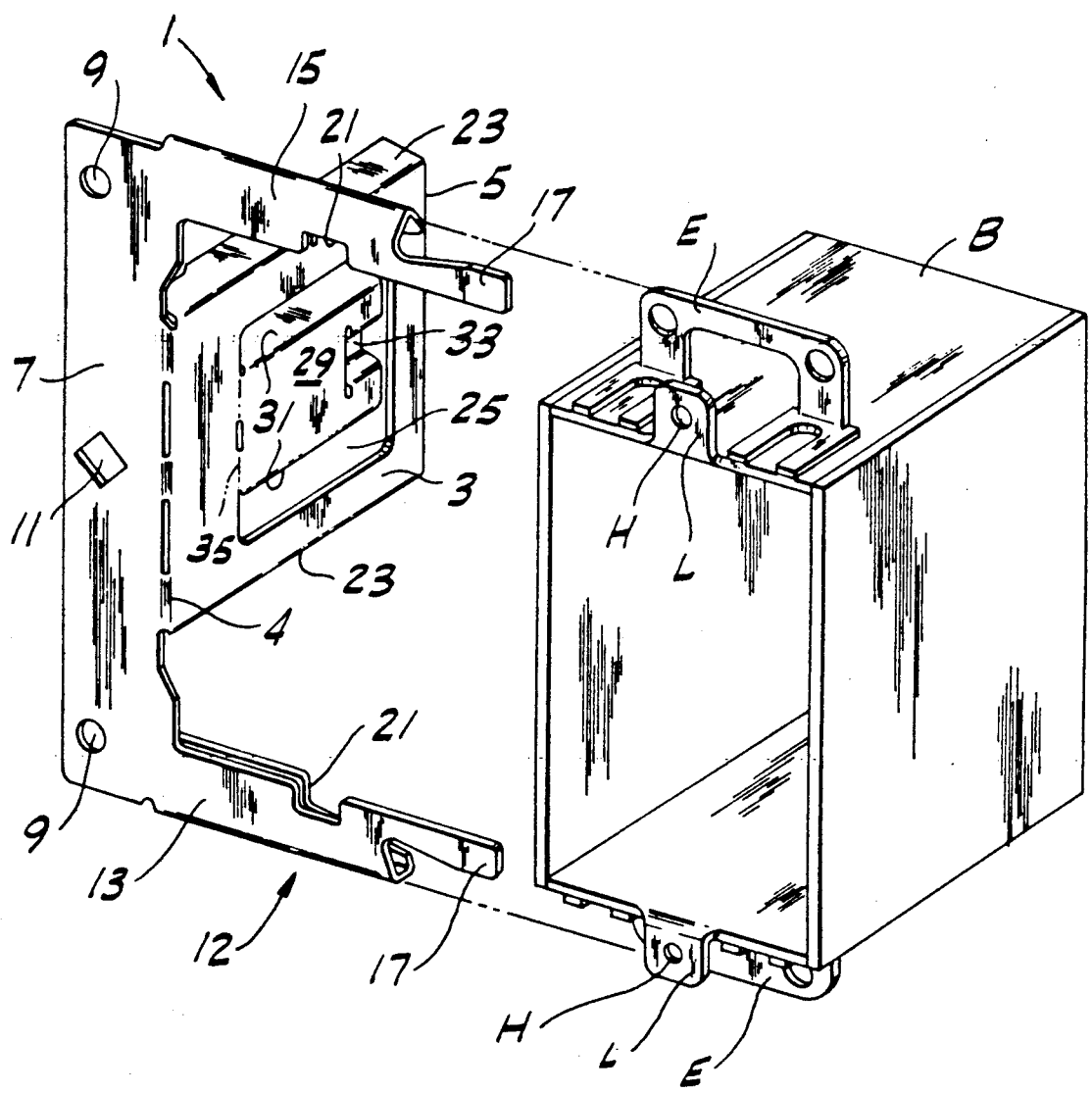
FIG. 1 is a perspective of a switchbox, and a bracket constructed according to the principles of this invention for mounting the switchbox on a wall stud.

Referring now to the drawings, there is generally indicated at 1a bracket of the present invention for mounting an electrical switchbox B or the like on a structural member such as a metal stud S. The metal stud is of generally channel shape, having a web W at one side of the stud, constituting the closed side of the stud, and generally parallel opposing flanges FF,RF extending laterally outwardly from the web. One flange constitutes a front flange FF at the front of the stud S and the other flange constitutes a rear flange RF at the rear of the stud, the flanges defining an open side O of the stud between them. The switchbox B includes two mounting ears E projecting outwardly from upper and lower surfaces of the switchbox. Lugs L also project outwardly from respective upper and lower surfaces of the switchbox and have holes H to receive a screws (not shown) for mounting a switch in the switchbox.

The bracket 1 is of sheet metal construction and includes support means comprising a bracket plate 3 of generally rectangular shape having a front edge 4 and a rear edge 5. A rectangular generally planar fastening flap 7 is provided generally adjacent the front edge 4 of the bracket plate 3 for attaching the bracket to the front flange FF of the wall stud S in a position in which the bracket plate 3 extends rearwardly adjacent one side of the wall stud. The flap 7 is integrally formed with the bracket plate 3 and is bent to extend laterally inwardly from the front edge 4 of the bracket plate. The flap 7 is adapted for face-to-face engagement with the front flange FF of the wall stud and has openings 9 for receiving fasteners for fixing the flap to the front flange. The flap also has a diamond shaped opening 11 for properly positioning the bracket on the stud S by aligning a mark made on the stud with the opening.

Figure 2:
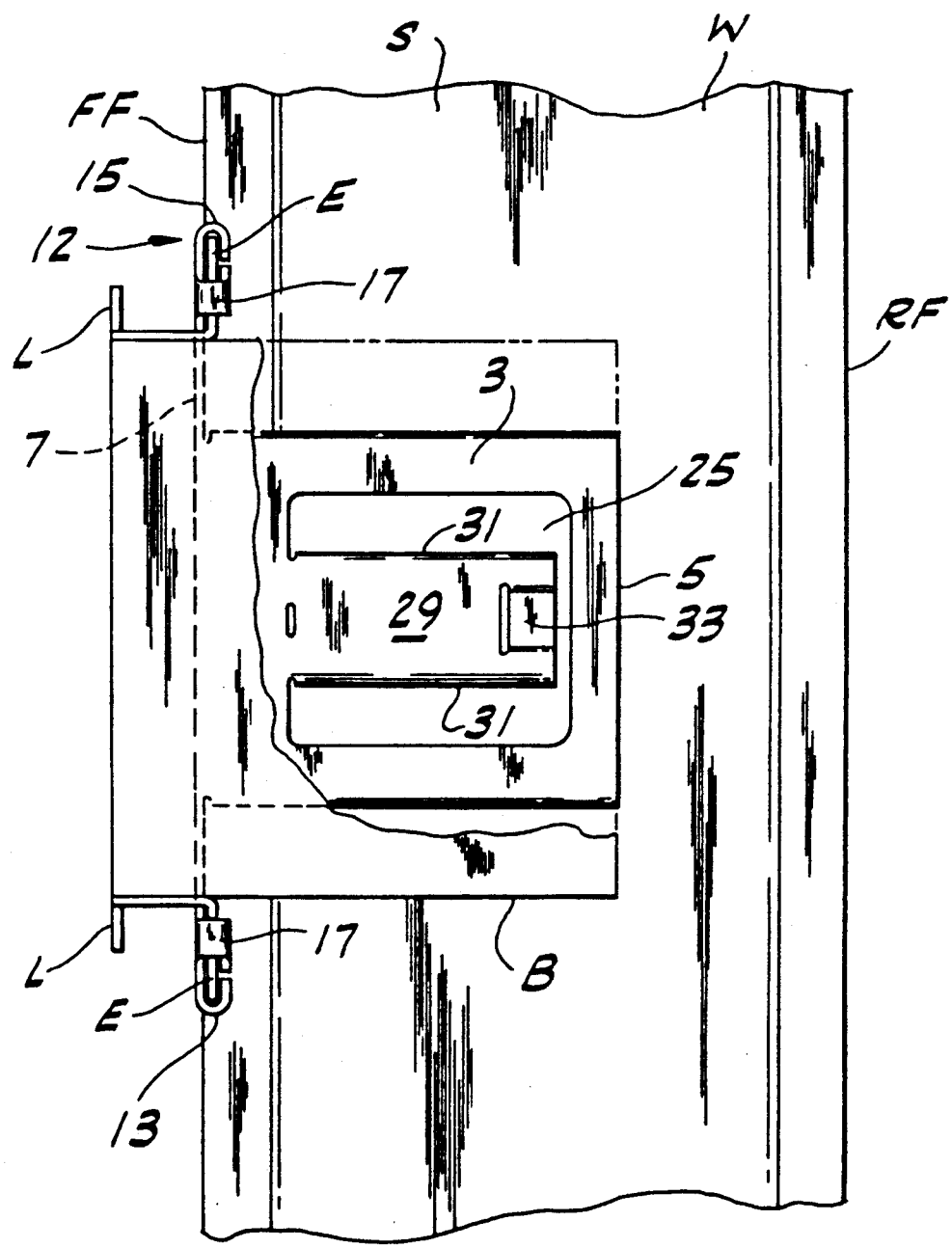
FIG. 2 is a side elevation of the bracket and switchbox as installed on a wall stud with parts broken away to show details of the bracket.

Indicated generally at 12 is means adjacent the front edge 4 of the br plate 3 for holding an electrical switchbox B or the like in fixed position relative to the bracket plate 3 with one side of the box generally adjacent the bracket plate and with an open front of the switchbox facing forwardly. Holding means 12 comprises a pair of generally parallel, spaced-apart track members 13,15 generally adjacent the front edge of the bracket plate 3 and extending laterally outwardly with respect to the bracket plate. The track members 13,15 are integrally formed with the flap 7. The lower track member 13, as viewed in FIGS. 1 and 2, is generally of U shape in transverse section and the upper track member 15 is generally of inverted-U shape in transverse section. The track members have open outer ends adapted to slidingly receive the mounting ears E on the switchbox B so that the switchbox may be inserted in the track members and slidably moved inwardly to a final position wherein the box generally abuts the bracket plate 3.

Figure 3:
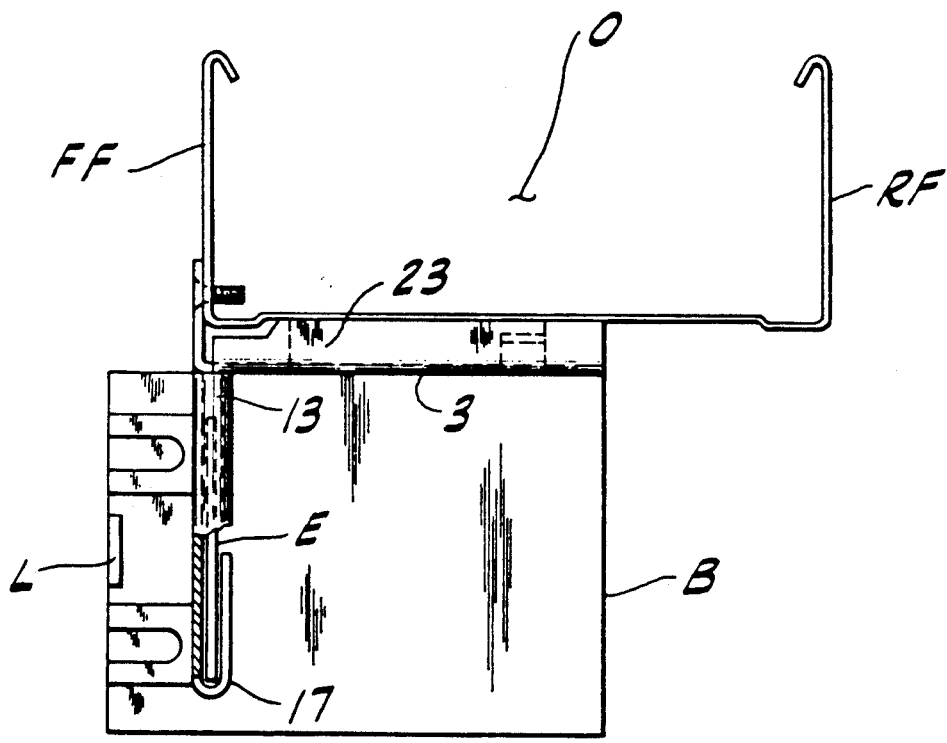
FIG. 3 is a horizontal section of the bracket and switchbox mounted a closed side of a wall stud.
Figure 4:
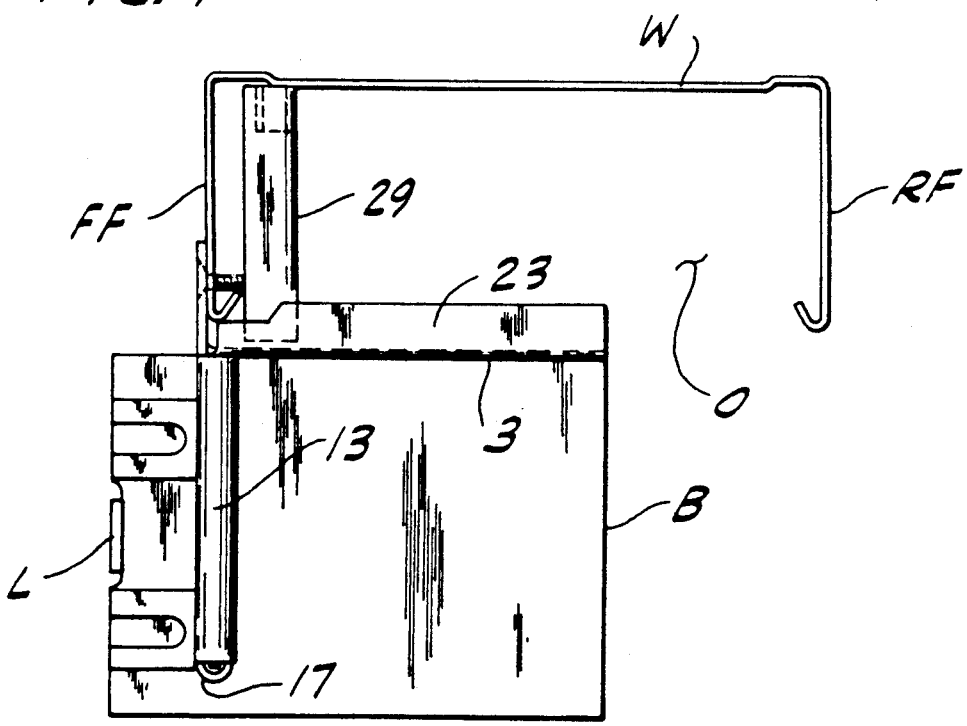
FIG. 4 is a horizontal section of the bracket and switchbox mounted on an open side of a wall stud.

A pair of tabs 17 formed by integral extensions of the track members 13,15 extending endwise of the track members and constitutes, in this embodiment, means for retaining the switchbox B in its stated final position. The tabs 17 are adapted to be manually bent to a position in which they are adapted for engagement by the ears E of the switchbox to prevent the switchbox from being slidably removed from the track members 13,15 (FIGS. 2-4). The track members have generally rectangular notches 21 in them which are aligned with the holes H in respective adjacent lugs L of the switchbox B. The notches 21 allow mounting screws for a switch (not shown) to pass the track members without interference.

The bracket plate 3 has opposite side edges with flanges 23 therealong extending laterally inwardly from the bracket plate. The flanges give the bracket plate a channel shape for strengthening the plate. The bracket plate has an opening 25 in it and an arm 29 is integrally attached at one end to the bracket plate at one side of the opening (the front side of the opening as shown in the drawings). The arm 29 extends in cantilever fashion from the bracket plate 3 and terminates in a free outer end. The arm 29 is adapted for movement from a first position in which the arm extends in front-to-rear direction with respect to the bracket plate 3 (FIGS. 1,2 and 3) to a second position in which the arm extends laterally inwardly from the bracket plate generally at right angles to the plate (FIG. 4). The side edges of the arm also have flanges 31 which strengthen the arm. When the bracket 1 is to be used at the open side 0 of a wall stud S and the depth of the wall stud in front-to-rear direction is greater than the length of the bracket plate 3 in front-to-rear direction, the arm 29 is adapted to be moved (bent) to the stated second position for engagement with the web W of the wall stud to support the bracket plate against lateral movement toward the web of the stud (FIG. 4). The arm has a groove 33 adjacent its outer free end engageable by a tool such as a screwdriver for enabling the arm to be bent along the fold line 35.

Thus is provided an improved bracket 1, inexpensively stamped and formed from sheet metal, for mounting an electrical switchbox B (or other device) on a metal wall stud S of channel configuration. The switchbox may be secured to the bracket without the use of screws by inserting the switchbox ears E into respective track members 13,15 and manually folding the tabs 17 to hold the ears in the track members. The same bracket may be used to mount electrical switchboxes of different depths because the switchbox is mounted on the bracket by ears at its front only. By mounting the switchbox B to the bracket only at its front, and because the bracket plate 3 supporting the switchbox against lateral movement is on the inward side of the switchbox, three sides and the rear wall of the switchbox are completely unobstructed by the bracket, providing easy access to the knock-outs on the switchbox to facilitate wiring of the box.

The same bracket 1 can be used to mount switchboxes B on metal studs S of different depths on the closed side or the open side 0 of the stud regardless of whether the stud backs up against a wall. The value of this feature is seen when the switchbox is mounted on the open side of a stud having no wall abutting its rear flange RF, such as when the back wall is an exterior wall. When a switch mounted on the switchbox is operated, the switchbox will be subjected to forces tending to pivot the bracket with respect to the front flange FF, the force having components pushing the switchbox into the wall and laterally inwardly toward the stud. If the device mounted on the bracket is an outlet rather than a switchbox, the same forces would be experienced when an electrical cable or cord is plugged into the outlet. However, because the arm 29 supports the bracket against the web W of the stud, the bracket resists any inward lateral pivoting motion to prevent the switchbox from being pushed into the wall regardless of the absence of drywall at the rear flange RF of the stud.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A bracket for mounting an electrical switchbox or the like on a metal stud of generally channel shape having a web at one side of the stud, constituting the closed side of the stud, generally parallel opposing flanges extending laterally outwardly from the web, one flange constituting a front flange at the front of the stud and the other flange constituting a rear flange at the rear of the stud, said flanges defining therebetween an open side of the stud, said bracket comprising support means having a front end and a rear end, means generally adjacent the front end of said support means for attaching the bracket to the front flange of the wall stud in a position in which said support means extends rearwardly adjacent one side of the wall stud, means generally adjacent the front end of said support means for holding an electrical switchbox or the like in fixed position relative to said support means with one side of the box generally adjacent said support means and with an open front of the switchbox facing forwardly, and an arm on said support means adapted for movement from a first position in which the arm extends in front-to-rear direction with respect to said support means to a second position in which the arm extends laterally inwardly from said support means whereby, when the bracket is to be used at the open side of a wall stud and the depth of the wall stud in front-to-rear direction is greater than the length of said support means in front-to-rear direction, said arm is adapted to be moved to said second position for engagement with the web of the wall stud to support said support means against lateral movement toward the web of the stud.

2. A bracket as set forth in claim 1 wherein said means for holding an electrical switchbox or the like comprises a pair of generally parallel, spaced-apart track members generally adjacent the front end of said support means and extending laterally outwardly with respect to said support means, said track members being adapted to slidably receive a pair of mounting ears on the switchbox projecting from opposite walls of the box whereby the switchbox may be slidably moved to a final position relative to said support means and wall stud, and means for retaining the switchbox in said final position.

3. A bracket as set forth in claim 2 wherein said retaining means comprises integral extensions of said track members adapted to be bent to a position in which they are adapted for engagement by the ears of the switchbox to prevent the switchbox from being slidably removed from the track members.

4. A bracket as set forth in claim 3 wherein said integral extensions are in the form of tabs extending endwise from the track members.

5. A bracket as set forth in claim 3 wherein one of said track members is generally of U shape in transverse section and the other track member is generally of inverted-U shape in transverse section, said track members having open outer ends into which said ears of the switchbox may be inserted and slidably moved inwardly to said final position.

6. A bracket as set forth in claim 2 wherein said means for attaching the bracket comprises fastening flap means bent to extend laterally inwardly from the front end of said support means, said fastening flap means being adapted for face-to-face engagement with the front flange of a wall stud and having openings therein for receiving fasteners therethrough.

7. A bracket as set forth in claim 6 wherein said track members are integrally formed with said fastening flap means.

8. A bracket as set forth in claim 7 further comprising an opening in said fastening flap means for locating the bracket relative to a marking on a wall stud.

9. A bracket as set forth in claim 7 wherein said support means comprises a bracket plate having a front edge, a rear edge and opposite side edges with flanges extending along said opposite side edges laterally inwardly from teh bracket plate.

10. A bracket as set forth in claim 9 wherein said support means has an opening therein, and wherein said arm is integrally attached at one end thereof to said support means at one end of the opening, said arm extending in cantilever fashion from said one side of the opening and terminating in a free outer end engageable with the web of a stud when the arm is in said second position.

11. A bracket as set forth in claim 10 wherein said arm has means at its outer free end engageable by a tool for enabling the arm to be bent to said second position.

12. A bracket adapted for mounting an electrical switchbox or the like on a metal stud of generally channel shape having a web at one side of the stud, constituting the closed side of the stud, generally parallel opposing flanges extending laterally outwardly from the web, one flange constituting a front flange at the front of the stud and the other flange constituting a rear flange at the rear of the stud, said flanges defining therebetween an open side of the stud, said bracket comprising, support means having a front end and a rear end, means generally adjacent the front end of said support means for attaching the bracket to the front flange of the wall stud in a position in which said support means extends rearwardly adjacent one side of the wall stud, and means generally adjacent the front end of said support means for holding an electrical switchbox or the like in fixed position relative to said support means with one side of the box generally adjacent said support means and with an open front of the switchbox facing forwardly.

said means for holding an electrical switchbox or the like comprising a pair of generally parallel, spaced-apart track members generally adjacent the front end of said support means and extending laterally outwardly with respect to said support means, said track members being adapted to slidably receive a pair of mounting ears on the switchbox projecting from opposite walls of the box whereby the switchbox may be slidably moved to a final position relative to said support means and wall stud, and retaining means comprising integral extensions of said track members adapted to be bent to a position in which they are adapted for engagement by the ears of the switchbox to prevent the switchbox from being slidably removed from the track members.

13. A bracket as set forth in claim 12 wherein said integral extensions are in the form of tabs extending endwise from the track members.

14. A bracket as set forth in claim 12 wherein one of said track members is generally of U shape in transverse section and the other track member is generally of inverted-U shaped in transverse section, said track members having open outer ends into which said ears of the switchbox may be inserted and slidably moved inwardly to said final position.

15. A bracket adapted for mounting an electrical switchbox or the like on a metal stud of generally channel shape having a web at one side of the stud, constituting the closed side of the stud, generally parallel opposing flanges extending laterally outwardly from the web, one flange constituting a front flange at the front of the stud and the other flange constituting a rear flange at the rear of the stud, said flanges defining therebetween an open side of the stud, said bracket comprising, support means having a front end and a rear end, means generally adjacent the front end of said support means for attaching the bracket to the front flange of the wall stud in a position in which said support means extends rearwardly adjacent one side of the wall stud, said means for attaching the bracket comprising fastening flat means bent to extent laterally inwardly from the front end of said support means, said fastening flap means being adapted for face-to-face engagement with the front flange of a wall stud and having openings therein for receiving fasteners therethrough, means generally adjacent the front end of said support means for holding an electrical switchbox or the like in fixed position relative to said support means with one side of the box generally adjacent said support means and with an open front of the switchbox facing forwardly, said means for holding an electrical switchbox or the like comprising a pair of generally parallel, spaced-apart track members generally adjacent the front end of said support means and extending laterally outwardly with respect to said support means, said track members being integrally formed with said fastening flap means and adapted to slidably receive a pair of mounting ears on the switchbox projecting from opposite walls of the box whereby the switchbox may be slidably moved to a final position relative to said support means and wall stud, and means for retaining the switchbox in said final position, and an arm on said support means adapted for movement from a first position in which the arm extends in front-to-rear direction with respect to said support means to a second position in which the arm extends laterally inwardly from said support means whereby, when the bracket is to be used at the open side of a wall stud and the depth of the wall stud in front-to-rear direction is greater than the length of said support means in front-to-rear direction, said arm is adapted to be moved to said second position for engagement with the web of the wall stud to support said support means against lateral movement toward the web of the stud.

16. A bracket adapted for mounting an electrical switchbox or the like on a metal stud of generally channel shape having a web at one side of the stud, constituting the closed side of the stud, generally parallel opposing flanges extending laterally outwardly from the web, one flange constituting a front flange at the front of the stud and the other flange constituting a rear flange at the rear of the stud, said flanges defining therebetween an open side of the stud, said bracket comprising, support means having a front end and a rear end, said support means comprises a bracket plate having a front edge, a rear edge and opposite side edges with flanges extending along said opposed side edges laterally inwardly from the bracket plate, means generally adjacent the front end of said support means for attaching the bracket to the front flange of the wall stud in a position in which said support means extends rearwardly adjacent one side of the wall stud, said means for attaching the bracket comprising fastening flap means bent to extend laterally inwardly from the front end of said support means, said fastening flap means being adapted for face-to-face engagement with the front flange of a wall stud and having openings therein for receiving fasteners therethrough, and means generally adjacent the front end of said support means for holding an electrical switchbox or the like in fixed position relative to said support means with one side of the box generally adjacent said support means and with an open front of the switchbox facing forwardly, said means for holding an electrical switchbox or the like comprising a pair of generally parallel, spaced-apart track members generally adjacent the front end of said support means and extending laterally outwardly with respect to said support means, said track members being integrally formed with said fastening flap means and adapted to slidably receive a pair of mounting ears on the switchbox projecting from opposite walls of the box whereby the switchbox may be slidably moved to a final position relative to said support means and wall stud, and means for retaining the switchbox in said final position.

17. A bracket as set forth in claim 16 wherein said support means has an opening therein, and wherein said arm is integrally attached at one end thereof to said support means at one side of the opening, said arm extending in cantilever fashion from said one side of the opening and terminating in a free outer end engageable with the web of a stud when the arm is in said second position.

18. A bracket for mounting a device on a structural member of generally channel shape having a web at one side of the member, constituting the closed side of the member, generally parallel opposing flanges extending laterally outwardly from the web, one flange constituting a front flange at the front of the member and the other flange constituting a rear flange at the rear of the member, said flanges defining therebetween an open side of the structural member, said bracket comprising support means having a front end and a rear end, means generally adjacent the front end of said support means for attaching the bracket to the front flange of the structural member in a position in which said support means extends rearwardly adjacent one side of the member, means generally adjacent the front end of said support means for holding said device in fixed position relative to said support means with the device generally adjacent said support means, and an arm on said support means adapted for movement from a first position in which the arm extends in front-to-rear direction with respect to said support means to a second position in which the arm extends laterally inwardly from said support means whereby, when the bracket is to be used at the open side of said structural member and the depth of the member in front-to-rear direction is greater than the length of said support means in front-to-rear direction, said arm is adapted to be moved to said second position for engagement with the web of the structural member to support said support means against lateral movement toward the web of the structural member.

19. A bracket as set forth in claim 18 wherein said support means comprises a bracket plate having a front edge, a rear edge and opposite side edges with flanges extending along said opposite side edges laterally inwardly from the bracket plate.

20. A bracket as set forth in claim 19 wherein said support means has an opening therein, and wherein said arm is integrally attached at one end thereof to said support means at one side of the opening, said arm extending in cantilever fashion from said one side of the opening and terminating in a free outer end engageable with the web of said structural member when the arm is in said second position.

* * * * *

UNITED STATES PATENT AND TRADEMARK OFFICE
CERTIFICATE OF CORRECTION

PATENT NO. : 5,005,792
DATED : April 9, 1991
INVENTOR(S) : Eric R. Rinderer

It is certified that error appears in the above—identified patent and that said Letters Patent is hereby corrected as shown below:

Column 6, claim 9, line 2, "teh", should read ---the---.

Column 6, claim 10, line 6, "one end of", should read ---one side of---.

Column 7, claim 15, line 9, "fastening flat", should read ---fastening flap---.

Column 7, claim 15, line 10, "extent", should read ---extend---.

Column 7, claim 16, line 59, "opposed", should read ---opposite---.

Signed and Sealed this

First Day of September, 1992

Attest:

DOUGLAS B. COMER

*Attesting Officer*     *Acting Commissioner of Patents and Trademarks*